United States Patent
Kazume

(10) Patent No.: US 11,055,558 B2
(45) Date of Patent: Jul. 6, 2021

(54) INFORMATION PROCESSING SYSTEM, METHOD OF PROCESSING INFORMATION, AND STORAGE MEDIUM

(71) Applicant: Minako Kazume, Kanagawa (JP)

(72) Inventor: Minako Kazume, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 218 days.

(21) Appl. No.: 16/353,252

(22) Filed: Mar. 14, 2019

(65) Prior Publication Data

US 2019/0303701 A1    Oct. 3, 2019

(30) Foreign Application Priority Data

Mar. 29, 2018    (JP) .............................. JP2018-065896

(51) Int. Cl.
| | |
|---|---|
| *G06K 9/34* | (2006.01) |
| *G06K 9/32* | (2006.01) |
| *G06F 16/16* | (2019.01) |
| *G06F 40/205* | (2020.01) |
| *G06F 40/284* | (2020.01) |

(52) U.S. Cl.
CPC ........... *G06K 9/344* (2013.01); *G06F 16/164* (2019.01); *G06F 40/205* (2020.01); *G06F 40/284* (2020.01); *G06K 9/325* (2013.01)

(58) Field of Classification Search
CPC ...... G06K 9/344; G06K 9/325; G06F 16/164; G06F 40/284; G06F 40/205
See application file for complete search history.

(56) References Cited

U.S. PATENT DOCUMENTS

| | | | | |
|---|---|---|---|---|
| 4,653,021 A | * | 3/1987 | Takagi | G06F 16/9017 |
| 5,170,466 A | * | 12/1992 | Rogan | G06F 16/58 715/255 |
| 5,179,649 A | * | 1/1993 | Masuzaki | G06K 9/3216 715/224 |
| 5,301,350 A | * | 4/1994 | Rogan | G06F 16/58 705/33 |
| 5,448,375 A | * | 9/1995 | Cooper | H04N 1/2166 358/403 |
| 5,680,223 A | * | 10/1997 | Cooper | H04N 1/2166 358/1.4 |
| 5,751,287 A | * | 5/1998 | Hahn | G06F 3/0481 715/775 |
| 6,163,623 A | * | 12/2000 | Ohta | G06K 9/00442 382/176 |
| 7,031,838 B1 | * | 4/2006 | Young | G06Q 10/06 702/2 |

(Continued)

FOREIGN PATENT DOCUMENTS

| | | |
|---|---|---|
| JP | 2005-244411 | 9/2005 |
| JP | 2006-211261 | 8/2006 |

*Primary Examiner* — Manav Seth
(74) *Attorney, Agent, or Firm* — Oblon, McClelland, Maier & Neustadt, L.L.P.

(57) ABSTRACT

An information processing system includes circuitry configured to acquire an optical character recognition (OCR) result of image data, obtained by performing OCR processing on the image data, store the OCR result in a memory, extract a first character string from the OCR result stored in the memory, and generate a file name to be assigned to a file of the image data using the extracted first character string.

7 Claims, 11 Drawing Sheets

(56) References Cited

U.S. PATENT DOCUMENTS

| | | | | |
|---|---|---|---|---|
| 7,032,030 | B1* | 4/2006 | Codignotto | G06Q 10/107 |
| | | | | 707/999.01 |
| 7,304,759 | B2* | 12/2007 | Kiyono | H04N 1/32128 |
| | | | | 358/1.15 |
| 7,756,332 | B2* | 7/2010 | Jager | G06K 9/00469 |
| | | | | 382/173 |
| 8,705,081 | B2* | 4/2014 | Mitsutake | G06Q 10/06 |
| | | | | 358/1.15 |
| 9,734,168 | B1* | 8/2017 | Shin | G06F 16/51 |
| 2005/0195446 | A1 | 9/2005 | Kasatani | |
| 2008/0117461 | A1* | 5/2008 | Mitsutake | G06Q 10/06 |
| | | | | 358/1.16 |
| 2017/0344544 | A1* | 11/2017 | Shin | G06F 16/5866 |
| 2019/0197305 | A1* | 6/2019 | Kanada | G06T 7/0002 |

* cited by examiner

TO XYZ CORPORATION
MR. JOHN SMITH

FROM PQR CORPORATION
MARY HUNT

ORDER OF FACSIMILE MACHINE

DEAR MR. SMITH:

THANK YOU FOR YOUR COOPERATION ON OUR BUSINESSES. WE WOULD LIKE TO PLACE AN ORDER AS BELOW AND WOULD LIKE YOU TO CONFIRM OUR ORDER IN DUE COURSE.

SPECIFICATION
1) CONTENTS OF ORDER: FACSIMILE MODEL "ABC"
2) DELIVERY DATE: MARCH 6, 2017
3) DELIVERY DESTINATION: OUR OFFICE (2F)

YOURS SINCERELY,
MARY HUNT

TO XYZ CORPORATION
MR. JOHN SMITH

FROM PQR CORPORATION
MARY HUNT

ORDER OF FACSIMILE MACHINE

DEAR MR. SMITH:

THANK YOU FOR YOUR COOPERATION ON OUR BUSINESSES.
WE WOULD LIKE TO PLACE AN ORDER AS BELOW AND WOULD
LIKE YOU TO CONFIRM OUR ORDER IN DUE COURSE.

SPECIFICATION
1) CONTENTS OF ORDER: FACSIMILE MODEL "ABC"
2) DELIVERY DATE: MARCH 6, 2017
3) DELIVERY DESTINATION: OUR OFFICE (2F)

YOURS SINCERELY,
MARY HUNT

INFORMATION PROCESSING SYSTEM, METHOD OF PROCESSING INFORMATION, AND STORAGE MEDIUM

CROSS-REFERENCE TO RELATED APPLICATION

This application claims priority pursuant to 35 U.S.C. § 119(a) to Japanese Patent Application No. 2018-065896, filed on Mar. 29, 2018 in the Japan Patent Office, the disclosure of which is incorporated by reference herein in its entirety.

BACKGROUND

Technical Field

This disclosure relates to an information processing system, a method of processing information, and a storage medium.

Background Art

Image processing apparatuses, such as multifunctional peripherals (MFPs), include a function for performing optical character recognition (OCR) processing.

The OCR processing is a process of extracting character or text from image data generated by optically scanning handwritten characters or printed characters from a document sheet using a scanner or image data of document received as facsimile data, and then converting the extracted character or text into character or text data.

SUMMARY

As one aspect of the present invention, an information processing system is devised. The information processing system includes circuitry configured to acquire an optical character recognition (OCR) result of image data, obtained by performing OCR processing on the image data, store the OCR result in a memory, extract a first character string from the OCR result stored in the memory, and generate a file name to be assigned to a file of the image data using the extracted first character string.

As another aspect of the present invention, a method of processing information is devised. The method includes acquiring an optical character recognition (OCR) result of image data, obtained by performing OCR processing on the image data, storing the OCR result in a memory, extracting a first character string from the OCR result stored in the memory, and generating a file name to be assigned to a file of the image data using the extracted first character string.

As another aspect of the present invention, a non-transitory computer readable storage medium storing one or more instructions that, when performed by one or more processors, cause the one or more processors to execute a method of processing information is devised. The method includes acquiring an optical character recognition (OCR) result of image data, obtained by performing OCR processing on the image data, storing the OCR result in a memory, extracting a first character string from the OCR result stored in the memory, and generating a file name to be assigned to a file of the image data using the extracted first character string.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 7 is an example of received image data;

FIG. 8 is an example of an optical character recognition (OCR) result of the image data of FIG. 7;

Figure 1:
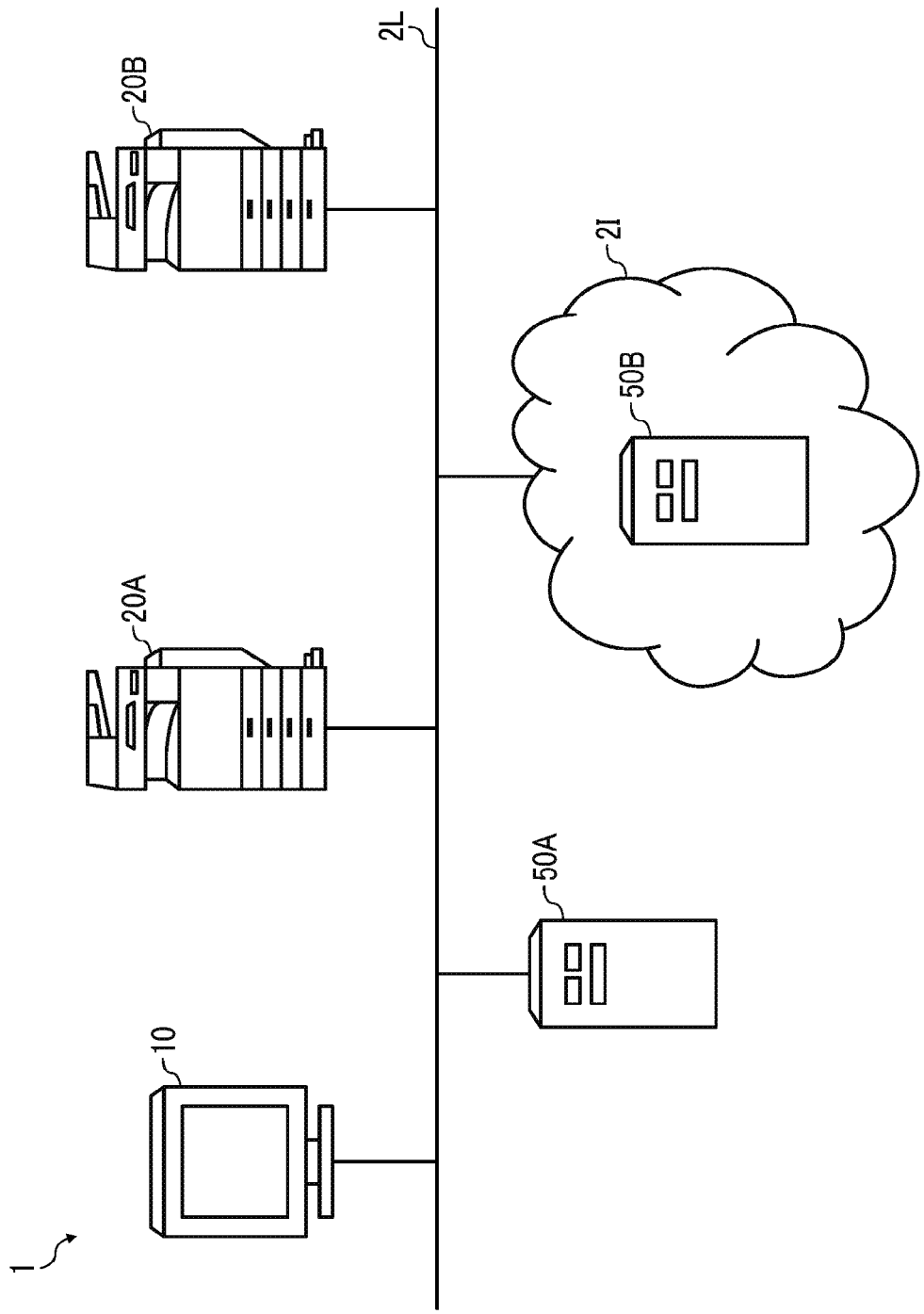
FIG. 1 is an example of a configuration of an information processing system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an embodiment of the present invention with reference to the accompanying drawings. In the drawings for describing the embodiment, components or parts having the same function or shape are denoted by the same reference numerals as far as possible, and the description thereof will be made once in this specification.

FIG. 1 is an example of a configuration of an information processing system 1 according to an embodiment of the present invention. The information processing system 1 is a system that can use one or more specific character strings included in image data as file names of image data. As illustrated in FIG. 1, the information processing system 1 includes, for example, a terminal apparatus 10, such as personal computer (PC), image forming apparatuses 20A and 20B, and servers 50A and 50B. In this description, the image forming apparatuses 20A and 20B may be collectively referred to as the image forming apparatus 20, or any one of the image forming apparatuses 20A and 20B may be referred to as the image forming apparatus 20 Further, the servers 50A and SOB may be collectively referred to as the server 50, or any one of the servers 50A and 50B may be referred to as the server 50.

In the information processing system 1, the number of terminal apparatus 10 is not limited to one. Further, the number of the image forming apparatus 20 and the server 50 are not limited to two. Hereinafter, document, such as business document is used for the following description. The document is not particularly limited as long as the document has images including characters, and the document may be, for example, drawing. The characters include, for example, texts, numbers, symbols, signs, icons, and the like that can be recognized by performing optical character recognition (OCR) processing. Further, the character string can be one character or a string of two or more characters.

The terminal apparatus 10 is a terminal apparatus, such as a general-purpose PC, a general-purpose portable information terminal, or the like.

The image forming apparatus 20 is, for example, a multifunctional peripheral (MFP) having various image processing functions, such as facsimile function, scanner function, copier function, OCR processing, printer function, and communication function. The image processed by the image forming apparatus 20 includes not only image data but also data not including image data, such as data including character or text information alone.

The image forming apparatus 20 can output a result of OCR processing (hereinafter, OCR result) as a display image, or can output the OCR result as data. The scanner can be a handy scanner that outputs the OCR result as data by communicating the data with a server (including a cloud server), communicating the data with a communication terminal, and/or writing the data to an external storage. When the OCR result is output as the data, there is no particular limitation on the format of the data. The image forming apparatus 20 can output the OCR result, for example, as text data, or output the OCR result by embedding the OCR result in a file, such as portable document format (PDF) file. Hereinafter, a description is given of an example case that the image forming apparatus 20 employs an MFP.

The image forming apparatus 20 includes, for example, an OCR module that converts images included in documents into character codes. If the OCR module is an optional function, some of the image forming apparatuses 20A and 20B may not be equipped with the OCR module. Further, the image forming apparatus 20 installs an application used for requesting the OCR processing to an image of a designated document. Hereafter, "application" may be also referred to as "appl."

The server 50 is an information processing apparatus having, for example, an image processing function and a communication function. The server 50 includes, for example, an OCR module for converting images in document into character codes. The server 50 has a function to execute the OCR processing based on a request from the application.

The terminal apparatus 10, the image forming apparatus 20, and the server 50A are connected to a local area network (LAN) 2L. The image forming apparatus 20 connects to the Internet 2I via the LAN2L to connect with the server 50B serving as a cloud server on the Internet 2I. Hereinafter, any one of the LAN2L and Internet 2I or both of them is referred to as a communication network 2. A part or all of the communication network 2 can use wireless communication, such as wireless fidelity (Wi-Fi).

Figure 2:
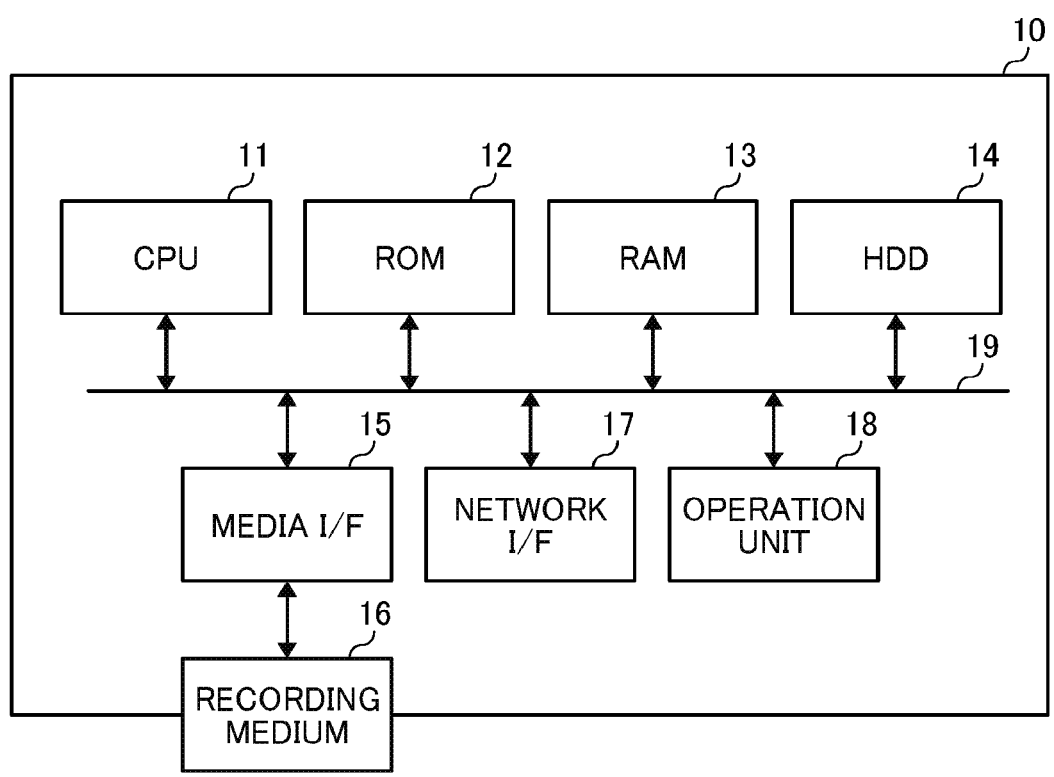
FIG. 2 is an example of a hardware block diagram of a terminal apparatus according to the embodiment.

FIG. 2 is an example of a hardware block diagram of the terminal apparatus 10 according to the embodiment. Hereinafter, a description is given of the hardware configuration of the terminal apparatus 10 in the information processing system 1 illustrated in FIG. 1 with reference to FIG. 2.

As illustrated in FIG. 2, the terminal apparatus 10 includes, for example, a central processing unit (CPU) 11, a read only memory (ROM) 12, a random access memory (RAM) 13, a hard disk drive (HDD) 14, a media interface (I/F) 15, a network I interface (I/F) 17, an operation unit 18, and a bus line 19.

The CPU 11 controls the operation of the terminal apparatus 10 entirely. The ROM 12 stores various programs such as operating system (OS), applications, a software development kit (SDK), and application programming interface (API) that operate in the terminal apparatus 10.

The RAM 13 is used as a work area of the CPU 11. The HDD 14 stores data to be used for various programs. The HDD 14 can be replaced with a non-volatile storage such as a solid state drive (SSD). The media I/F 15 is an interface for reading out information stored in an external memory, such as a recording medium 16, and writing information to the recording medium 16.

The network I/F17 is, for example, a communication unit for communicating with other devices via the communication network 2 using, for example, Ethernet (registered trademark) or Wi-Fi. The operation unit 18 is an interface for receiving an input by a user operation. The operation unit 18 is, for example, a liquid crystal display (LED) or an organic electroluminescence (OEL) display equipped with a touch panel function, or a keyboard and a mouse. The bus line 19 is an address bus and/or data bus for electrically connecting each of the components as illustrated in FIG. 2.

Figure 3:
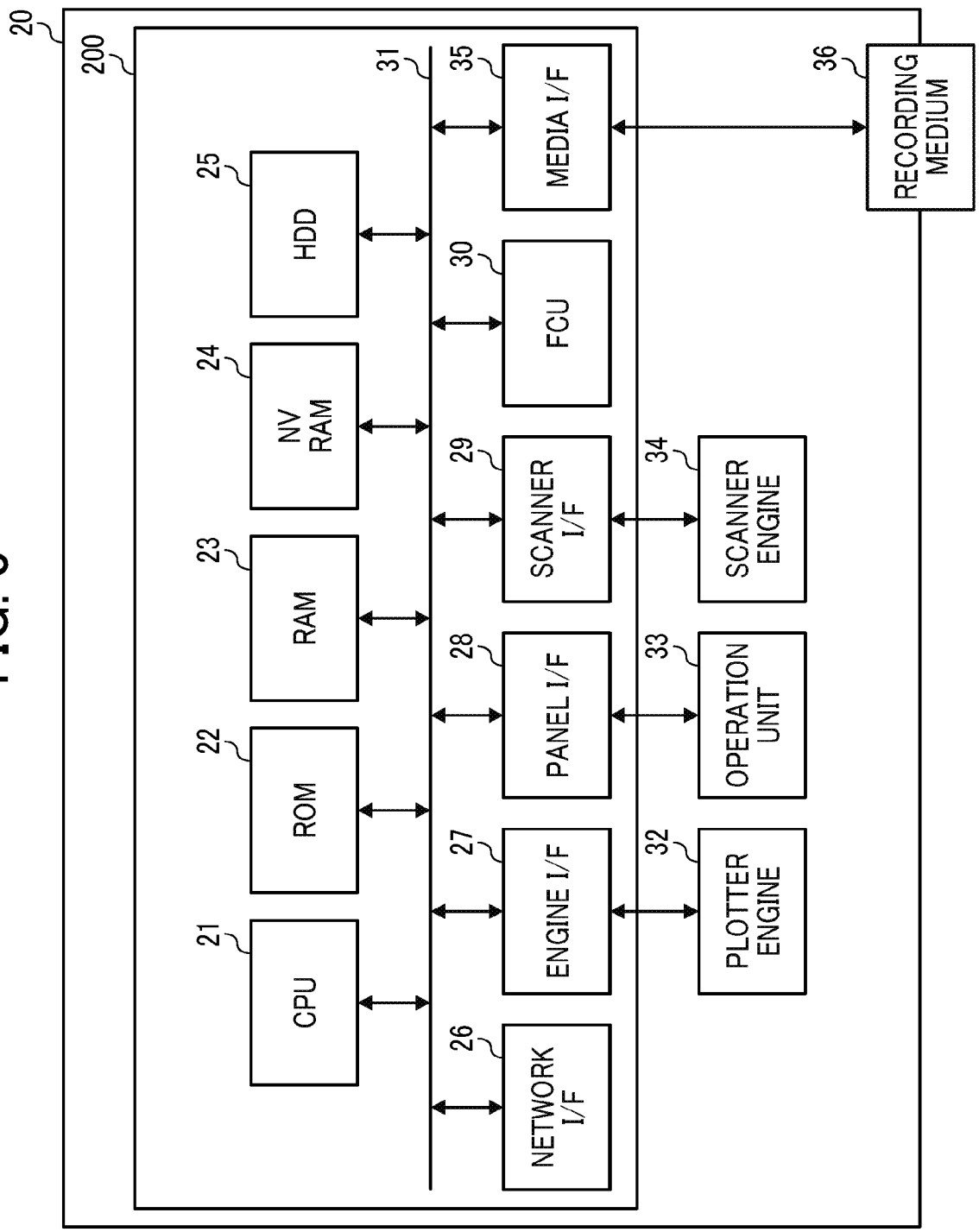
FIG. 3 is an example of a hardware block diagram of an information processing apparatus according to the embodiment.

FIG. 3 is an example of a hardware block diagram of the image forming apparatus 20 according to the embodiment. Hereinafter, a description is given of a hardware configuration of the image forming apparatus 20 in the information processing system 1 illustrated in FIG. 1 with reference to FIG. 3.

As illustrated in FIG. 3, the image forming apparatus 20 includes, for example, a controller 200. The controller 200 includes, for example, a CPU 21, a ROM 22, a RAM 23, a non-volatile RAM (NVRAM), 24, an HDD 25, a network I/F 26, an engine I/F 27, a panel I/F 28, a scanner I/F 29, a facsimile controller unit (FCU) 30, a media I/F 35 and a bus line 31. Further, the image forming apparatus 20 includes, for example, a plotter engine 32, an operation unit 33, and a scanner engine 34.

The CPU 21 controls the operation of the image forming apparatus 20 entirely. The ROM 22 stores various programs such as operating system, applications, SDK, and API that operate on the image forming apparatus 20. The RAM 23 is used as a work area of the CPU 21. The NVRAM 24 and the HDD 25 store data used for various programs. The data includes data during the OCR processing and OCR result data.

The network I/F 26 is, for example, a communication unit for communicating with other devices via the communication network 2 using, for example, Ethernet (registered trademark) or Wi-Fi. The engine I/F 27 is an interface connectable to the plotter engine 32. The panel I/F 28 is an interface connectable to the operation unit 33. The scanner I/F 29 is an interface connectable to the scanner engine 34. The FCU 30 performs facsimile communication to transmit and receive facsimile data, which is an example of image data, to and from an external facsimile terminal.

The media IN 35 is an interface for reading out information stored in an external memory, such as a recording medium 36, and writing information to the recording medium 36. The bus line 31 is an address bus and/or a data bus for electrically connecting each of the components as illustrated in FIG. 3.

The plotter engine 32 controls the operation of the plotter in the image forming apparatus 20 during the printing process. When the plotter is an inkjet printer, the plotter includes an inkjet head, and when the plotter is a laser printer, the plotter includes a photosensitive device, a laser irradiation device, and a transfer device. The operation unit 33 is, for example, a liquid crystal display (LED) or an organic electroluminescence (OEL) display equipped with a touch panel function, and receives an input from a user, such as settings, conditions, and instructions.

The scanner engine 34 controls the operation of the scanner in the image forming apparatus 20. The scanner is not particularly limited. The scanner includes, for example, a pressure plate, an automatic document feeder (ADF), and an imaging device, which are any devices used for reading or scanning image from documents.

Figure 4:
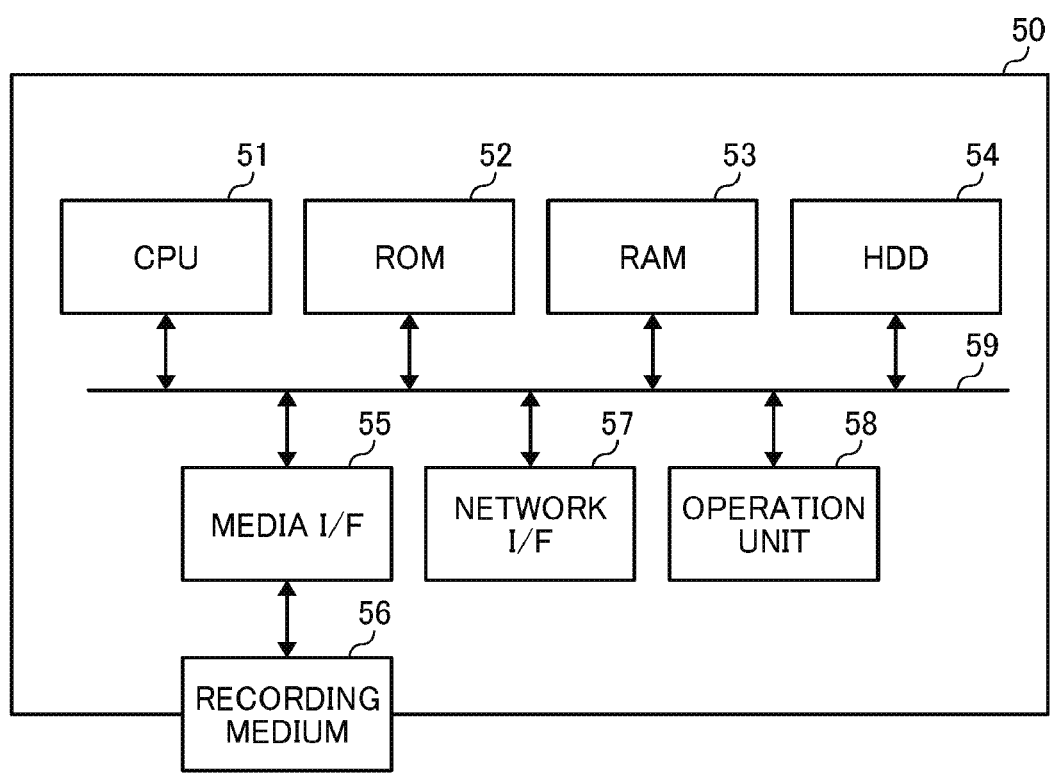
FIG. 4 is a is an example of a hardware block diagram of a server according to the embodiment.

FIG. 4 is an example of a hardware block diagram of the server 50 according to the embodiment. Hereinafter, a description is given of a hardware configuration of the server 50 in the information processing system 1 illustrated in FIG. 1 with reference to FIG. 4.

As illustrated in FIG. 4, the server 50 includes, for example, a CPU 51, a ROM 52, a RAM 53, a hard disk drive (HDD) 54, a media I/F 55, a network I/F 57, an operation unit 58, and a bus line 59.

The CPU 51 controls the operation of the server 50 entirely. The ROM 52 stores various programs, such as OS, application, SDK, and API that operate on the server 50. The RAM 53 is used as a work area of the CPU 51. The HDD 54 stores data to be used for various programs. The data includes, for example, data during the OCR processing and OCR result data. The HDD 54 can be replaced with a non-volatile storage such as SSD. The media I/F 55 is an interface for reading out information stored in an external memory, such as a recording medium 56, and writing information to the recording medium 56.

The network I/F 57 is, for example, a communication unit for communicating with other devices via the communication network 2 using, for example, Ethernet (registered trademark) or Wi-Fi. The operation unit 58 is an interface for receiving an input by a user operation. The operation unit 58 is, for example, a liquid crystal display (LED) or an organic electroluminescence (OEL) display equipped with a touch panel function, or a keyboard and a mouse. The bus line 59 is an address bus and/or a data bus for electrically connecting each of the components as illustrated in FIG. 4.

Figure 5:
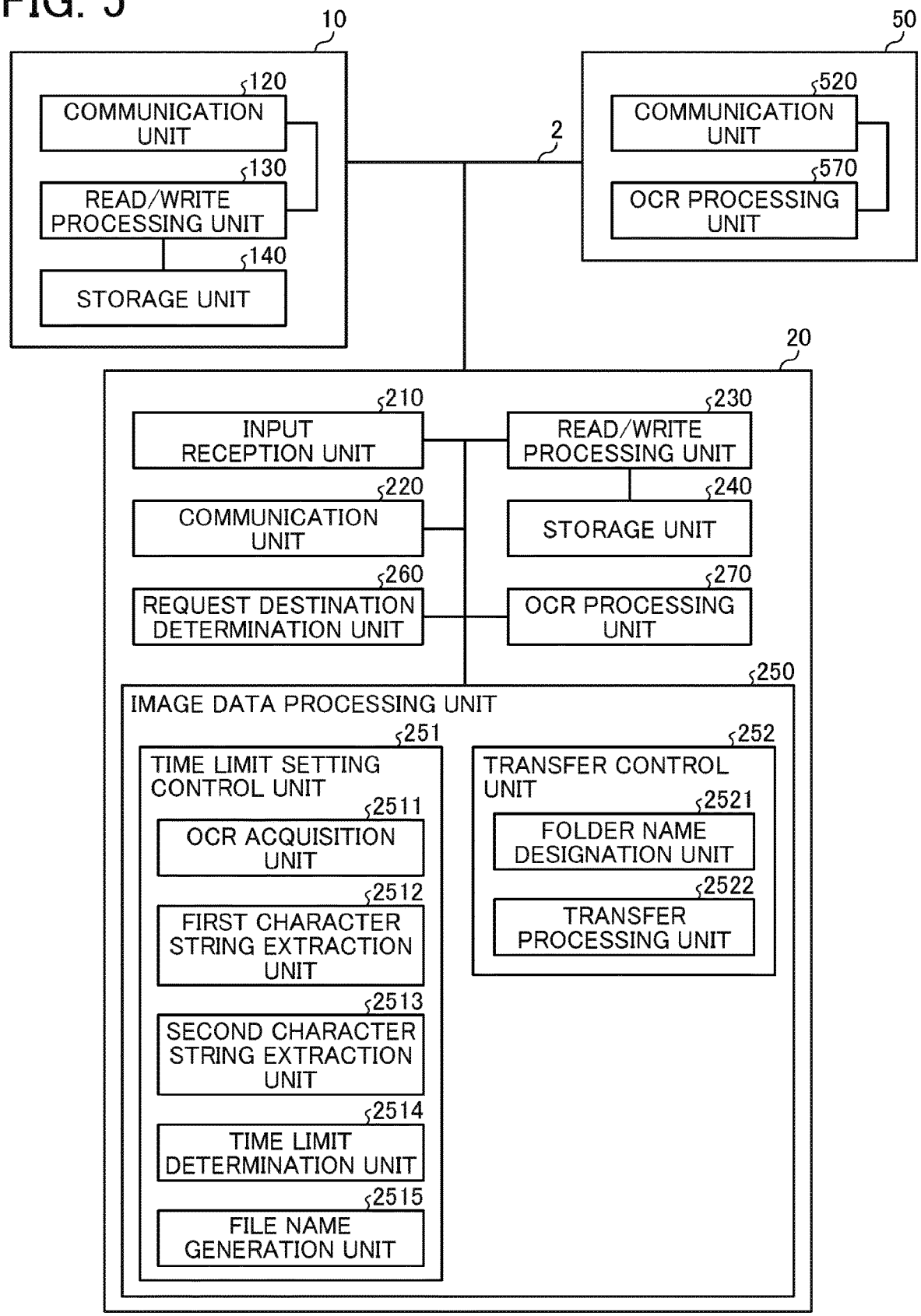
FIG. 5 is a functional block diagram of the information processing system according to the embodiment.

Hereinafter, a description is given of a functional configuration of the terminal apparatus 10, the image forming apparatus 20, and the server 50 with reference to FIG. 5. FIG. 5 is an example of a functional block diagram of the terminal apparatus 10, the image forming apparatus 20, and the server 50 in the information processing system 1 illustrated in FIG. 1. In an example case in FIG. 5, the terminal apparatus 10, the image forming apparatus 20, and the server 50 are communicatively connected via the communication network 2.

As illustrated in FIG. 5, the terminal apparatus 10 includes, for example, a communication unit 120, a read/write processing unit 130, and a storage unit 140. Each of these units is a functional unit, which is implemented by operating any one of the components illustrated in FIG. 2 under an instruction from the CPU 11 that executes one or more programs used for the terminal apparatus 10 by loading the programs on the RAM 13 from the ROM 12.

The communication unit 120, implemented by an instruction from the CPU 11 and processing of the network I/F 17, controls communication with other devices connected via the communication network 2.

The read/write processing unit 130, implemented by using the RAM 13 and/or the HDD 14 as a work area under the control of the CPU 11, performs a function of storing various data in the storage unit 140 and reading out the data stored in the storage unit 140.

The storage unit 140, implemented by the ROM 12 and/or the HDD 14, performs a function of storing various programs, various data, and various types of setting information required for operation. The storage unit 140 can be implemented by using a temporary storage function of the RAM 13.

As illustrated in FIG. 5, the image forming apparatus 20 includes, for example, an input reception unit 210, a communication unit 220, a read/write processing unit 230, and a storage unit 240. Each of these units is a functional unit, which is implemented by operating any one of the components illustrated in FIG. 3 under a command from the CPU 21 that executes one or more programs used for the image forming apparatus 20 by loading the programs on the RAM 23 from the ROM 22.

The input reception unit 210, implemented by using the RAM 23 as a work area under the control of the CPU 21 by executing one or more programs stored in the ROM 22 and/or HDD 25, receives an input of an instruction from an external device or an input of an instruction from a user.

The communication unit 220, implemented by an instruction from the CPU 21 and processing of the network I/F 26, controls communication with other devices connected via the communication network 2.

The read/write processing unit 230, implemented by using the RAM 23 as a work area under the control of the CPU 21 by executing one or more programs stored in the ROM 22 and/or HDD 25, performs a function of storing various data in the storage unit 240 and reading out the data stored in the storage unit 240.

The storage unit 240, implemented by the ROM 22 and/or the HDD 25, performs a function of storing various programs, data, and various types of setting information required for operation. The storage unit 240 can be implemented by using a temporary storage function of the RAM 23.

The storage unit 240 stores a list of a first character string CS1 (see Table 1) and a list of a second character string CS2 (see Table 2). The first character string CS1 is a first type of character string and the second character string CS2 is a second type of character string, which can be pre-set as specific character strings by a user and used for managing various documents, such as facsimile documents. As indicated in Table 1, the list of the first character string CS1 includes, for example, a plurality of character strings set by the user, in which each character string includes one or more characters. As indicated in Table 2, the list of the second character string CS2 includes, for example, a plurality of character strings set by the user, in which each character string includes one or more characters. The input reception unit 210 receives the list of the first character string CS1 and the list of the second character string CS2 as an input from the user, and then the list of the first character string CS1 and the list of the second character string CS2 are stored in the storage unit 240 using the function of the read/write processing unit 230.

TABLE 1

| | First character string CS1 |
|---|---|
| 1 | delivery date |
| 2 | response date |
| 3 | due date |

TABLE 2

| | Second character string CS2 |
|---|---|
| 1 | MM month, DD day, AD YYYY |
| 2 | MM month, DD day, YYYY |
| 3 | DD/MM/YYYY |

Hereinafter, a description is given of the first character string CS1 and the second character string CS2, which are different types of character strings.

The first character string CS1 represents, for example, a character string indicating a time limit indicator. As to the time limit indicator, the storage unit 240 stores three types of character strings, such as "delivery date," "response date," and "due date" in advance as the first character string CS1 as illustrated in Table 1.

The second character string CS2 represents, for example, a character string indicating exact time limit information. As to terms of the exact time limit information, the storage unit 240 stores three types of character strings, such as "MM month, DD day, AD YYYY" "MM month, DD day, YYYY" and "DD/MM/YYYY" as the second character string CS2 as illustrated in Table 2, in which Y, M, and D does not represent a particular character string but represent any number.

Although each of Table 1 and Table 2 includes the list of three character strings, the number of stored character strings is not limited thereto, and the order of storing the character strings is not also limited to a particular order. Table 2 stores information using "year/month/day," but not limited thereto. For example, Table 2 can store information on day of week, and time, or a combination of "year/month/day" and day of week and time. Further, the specific character string is composed of not only the specific characters, but also a combination of a specific character string and any character string as indicated in the second character string CS2.

As illustrated in FIG. 5, the image forming apparatus 20 further includes, for example, an image data processing unit 250, a request destination determination unit 260, and an OCR processing unit 270. Each of these units is a functional unit, which is implemented by operating any one of the components illustrated in FIG. 3 under a command from the CPU 21 that executes one or more programs used for the image forming apparatus 20 by loading the programs on the RAM 23 from the ROM 22.

As illustrated in FIG. 5, the image data processing unit 250 includes, for example, a time limit setting control unit 251 and a transfer control unit 252. The image data processing unit 250 performs a function of transferring image data to the terminal apparatus 10 as one document set with a time limit, such as deadline. Specifically, the time limit setting control unit 251 sets a time limit in accordance with the image data. Then, the transfer control unit 252 transfers the image data as the document set with the time limit to the terminal apparatus 10.

As illustrated in FIG. 5, the time limit setting control unit 251 includes, for example, an OCR acquisition unit 2511, a first character string extraction unit 2512, a second character string extraction unit 2513, a time limit determination unit 2514, and a file name generation unit 2515.

The OCR acquisition unit 2511 transmits an OCR request to the OCR module, and then acquires an OCR result of image data from the OCR module. The first character string extraction unit 2512 and the second character string extraction unit 2513 respectively extract the first character string CS1 and the second character string CS2 from the OCR result. The time limit determination unit 2514 determines whether the document is set with the time limit based on the extracted character string. Based on the extracted character string, the file name generation unit 2515 generates a new file name to be assigned to the image data to be managed as the document set with the time limit.

As illustrated in FIG. 5, the transfer control unit 252 includes, for example, a folder name designation unit 2521 and a transfer processing unit 2522. The folder name designation unit 2521 designates a folder name (directory name) used for storing the image data to be managed as the document set with the time limit. The transfer processing unit 2522 transfers the image data to be managed as the document set with the time limit to the terminal apparatus 10.

The request destination determination unit 260 determines a specific OCR module that can perform the OCR processing as an OCR request destination.

The OCR processing unit 270 performs the OCR processing on the image data in accordance with the OCR request, and then outputs the OCR result.

As illustrated in FIG. 5, the server 50 includes, for example, a communication unit 520 and an OCR processing unit 570, which is an OCR module. Each of these units is a functional unit, which is implemented by operating any one of the components illustrated in FIG. 4 under a command from the CPU 51 that executes one or more programs used for the server 50 by loading the programs on the RAM 53 from the ROM 52.

The communication unit 520, implemented by an instruction from the CPU 51 and the processing of the network I/F 57, controls communication with other devices connected via the communication network 2.

The OCR processing unit 570 performs the OCR processing on the image data in accordance with the OCR request, and outputs the OCR result.

Figure 6:
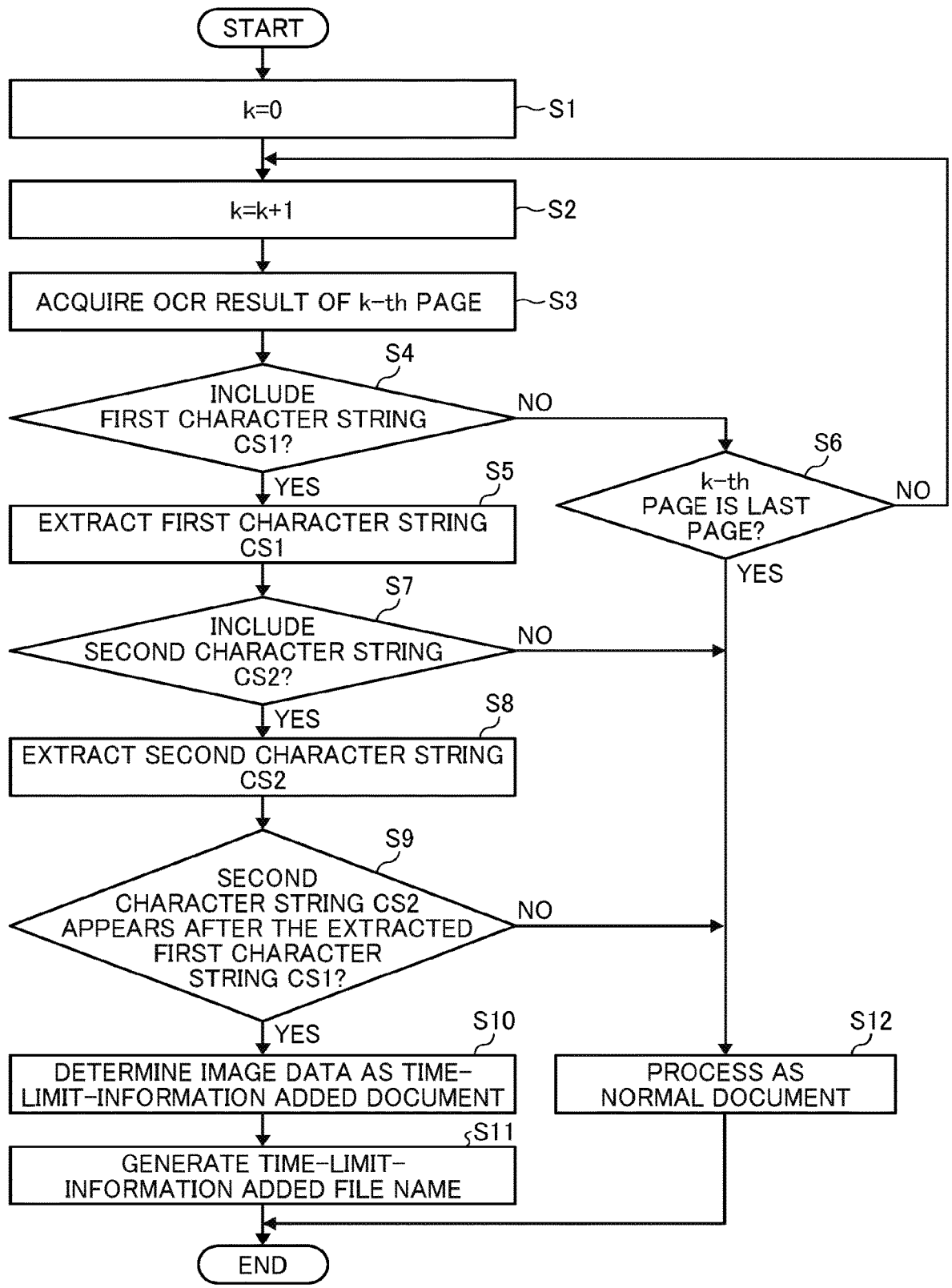
FIG. 6 is an example of a flowchart illustrating the steps of setting time limit information to image data.

Hereinafter, a description is given of processing in the information processing system 1. FIG. 6 is an example of a flowchart illustrating the steps of setting a time limit information to image data. This sequence is started, for example, by receiving image data having "k" pages via a facsimile communication, or by inputting an instruction for executing this sequence to the image data having "k" pages by a user from the input reception unit 210.

At first, the time limit setting control unit 251 initializes "k," in which the time limit setting control unit 251 sets k=0 (step S1) and then adds one to "k" (step S2).

The OCR acquisition unit 2511 acquires an OCR result of the k-th page of the image data, received as facsimile data or read by the scanner, to perform the OCR acquisition processing (step S3). For example, when image data illustrated in FIG. 7 is received as facsimile data, text data illustrated in FIG. 8 can be obtained or acquired as the OCR result in step S3.

Figure 9:
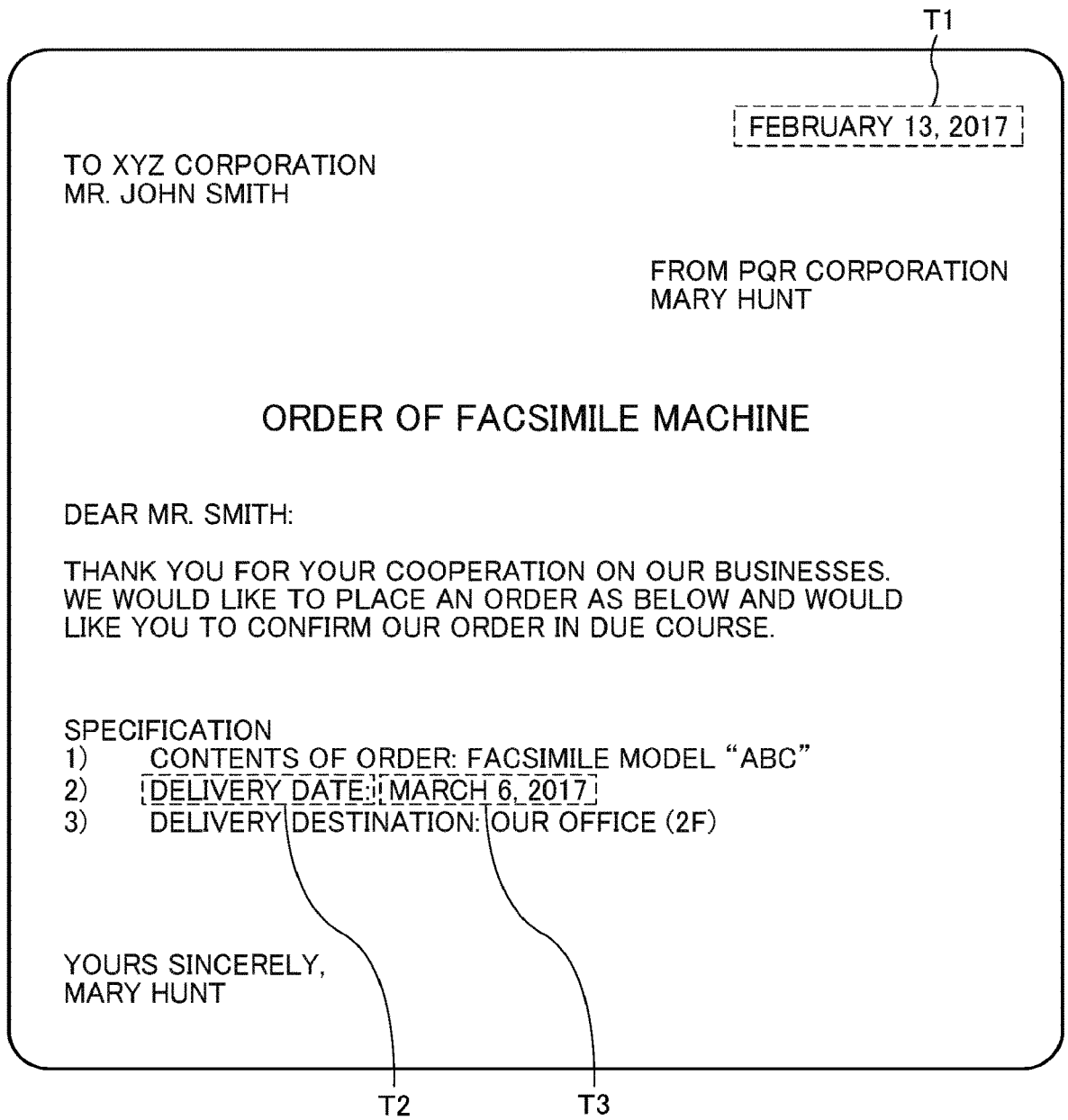
FIG. 9 is an example of character strings extracted from the OCR result of FIG. 8.

As a first extraction step, the first character string extraction unit 2512 determines whether the first character string CS1 representing the time limit indicator is included in the acquired OCR result of the k-th page of the image data by referring Table 1 (step S4). FIG. 9 is an example of extracting one or more character strings from the OCR result illustrated in FIG. 8. In an example case in FIG. 9, a character string T2 of "delivery date" is determined as the character string included in the list of the first character string CS1 of Table 1.

If any character string included in the list of the first character string CS1 exists in the acquired OCR result of the k-th page of the image data (S4: YES) as illustrated in FIG. 9, the first character string extraction unit 2512 extracts and outputs the corresponding character string as an extraction result (step S5). By contrast, if the character string included in the list of the first character string CS1 does not exist in the acquired OCR result of the k-th page of the image data (S4: NO), the time limit setting control unit 251 determines whether the k-th page of the image data is the last page (step S6).

If the k-th page of the image data is the last page (S6: YES), the time limit setting control unit 251 processes the document as a normal document (step S12), which is not the time-limit-information added document and ends the sequence. The processing as the normal document includes, for example, creating a message to a user that the concerned document is not the time-limit-information added document but the normal document, and then displaying the message using the operation unit 33 and/or transmitting the message to the terminal apparatus 10. Further, in addition to the message creation or in place of the message creation, the processing as the normal document includes, for example, designating a preset folder used for saving the document as normal document in the terminal apparatus 10 and transferring the document to the preset folder set in the terminal apparatus 10, which can be set by a user or an administrator of the information processing system appropriately.

After the first extraction in step S5, the second extraction is performed in step S7. Specifically, the second character string extraction unit 2513 refers to Table 2 stored in the storage unit 240 to determine whether the second character string CS2 representing the exact time limit information (e.g., year/month/date, day of week, time, and combination of these) exists in the acquired OCR result of the k-th page of the image data (step S7). In an example case in FIG. 9, the second character string extraction unit 2513 determines a character string T1 of "Feb. 13, 2017" and a character string T3 of "March 06, 207" as the character strings included in the list of the second character string CS2.

If any character string included in the list of the second character string CS2 exists in the acquired OCR result of the k-th page of the image data (S7: YES) as illustrated in FIG. 9, the second character string extraction unit 2513 extracts and outputs the corresponding character string as an extraction result (step S8). If the character string included in the list of the second character string CS2 does not exist in the acquired OCR result of the k-th page of the image data (S7: NO), the time limit setting control unit 251 processes the document as the normal document (step S12) and ends the sequence.

Figure 10:
FIG. 10 is an example of an output format of character strings extracted from the OCR result of FIG. 8.

FIG. 10 is an extraction result extracted in steps S5 and S8. As illustrated in FIG. 10, text data of the character string T1 of "Feb. 13, 2017," text data of the character string T2 of "delivery date" and text data of the character string T3 of "Mar. 6, 2017" are extracted in the order that appears in the image data of FIG. 7.

Then, the time limit determination unit 2514 performs the time limit determination step by referring the extraction result to determine whether the extracted second character string CS2 appears after the extracted first character string CS1 (step S9). If the extracted second character string CS2 appears after the extracted first character string CS1 (S9: YES), the time limit determination unit 2514 determines that the image data is a document that is to be managed with the time limit information (step S10), which is the time-limit-information added document.

In an example case in FIG. 10, the first character string CS1 such as "delivery date" is included, and the second character string CS2, such as "Mar. 6, 2017" appears after the character string of "delivery date" (first character string CS1). Therefore, the image data, from which these character strings have been extracted, is regarded as the document to be managed with the time limit information of "Mar. 6, 2017."

Then, the file name generation unit 2515 performs a file name generation step, in which the file name generation unit 2515 generates a file name of the document to be managed with the time limit information (hereinafter, referred to as a time-limit-information added file name) based on the extraction result (step S11). For example, the time-limit-information added file name is set by placing the first character string CS1 at the front, the second character string C2 after the first character string CS1, and then the original file name of the image data after the second character string C2.

When the extraction result of FIG. 10 is used, the file name generation unit 2515 adds "delivery_date_20170306_" at the beginning of the original file name of the image data. If the original file name of the image data illustrated in FIG. 7 is "Oomori_office-20170217.tif," the file name that is newly assigned to the time-limit-information added document becomes "delivery_date_20170306 Oomori_office-20170217.tif." Further, the file name is not limited thereto. For example, the file name generation unit 2515 can add the first character string CS1 of the "delivery date" alone to the time-limit-information added document, such as "delivery_date_Oomori_office-20170217.tif."

As above described, if the OCR result of the image data includes a specific character string, which is pre-set for managing facsimile documents by a user, the file name of the image data can be generated using the specific character string. Therefore, the image data, such as facsimile data, can be managed using the specific character string.

Although the first character string CS1 and the second character string CS2 can be used independently, the first character string CS1 and the second character string CS2 can be combined and used in the embodiment. Specifically, by using the appearance order of the first character string CS1 and the second character string CS2 in the document determined in step S9, the document can be managed with higher accuracy. In addition, when the time-limit-information added file name is generated in step S11 by determining the order of use of the first character string CS1 and the second character string CS2, an information management system that is more user-friendly can be devised.

In the sequence in FIG. 6, if the first character string CS1 is included the OCR result in step S4, the acquiring of OCR result in step S3 can be omitted for one or more subsequent pages. With this configuration, the processing time and the processing load of the system can be reduced compared to a case when the OCR processing is performed on all pages of the image data having a plurality of pages. In particular, if the extracted character string is related to the time limit, the frequency of occurrence of the character string related to the time limit in one document is not so high, and thereby the time-limit-information added file name can be created using the character string acquired at first. If the processing load reduction is not a concern, the OCR processing can be performed on all pages, in which the time-limit-information added file name can be overwritten each time the file is created, or the to-be-used time-limit-information added file name candidates can be stored and then the time-limit-information added file name can be selected by the user.

In the sequence in FIG. 6, the time-limit-information added file name is generated in step S11 after the time limit information is determined in step S10. However, if the extraction result is already output, the file name can be generated in the file name generation step. Therefore, the time limit determination step may not be required when performing the file name generation step, and thereby the file name generation step can be performed independently with respect to the time limit determination step.

Figure 11:
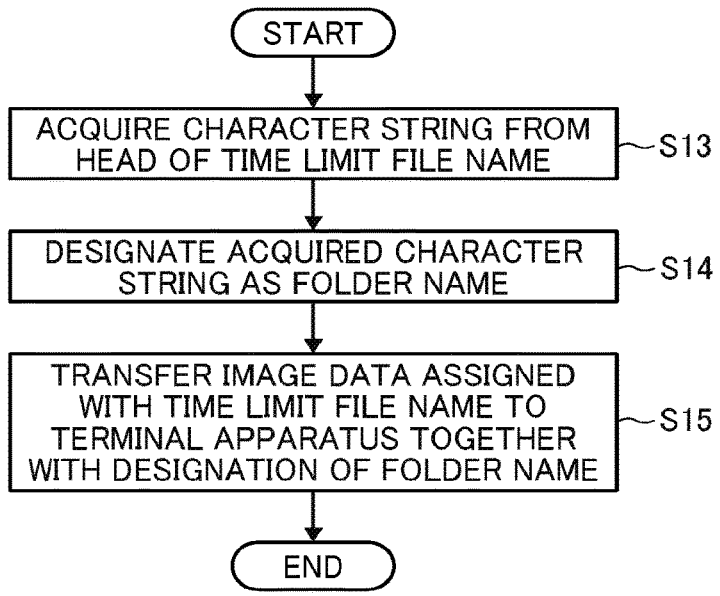
FIG. 11 is an example of a flowchart illustrating the steps of transferring image data to a folder used for storing image data.

Hereinafter, a description is given of a process of transferring image data with reference to FIG. 11. After determining the time-limit-information added file name for the image data in the sequence in FIG. 6, the image data is transferred to the terminal apparatus 10 using a sequence of FIG. 11.

At first, the folder name designation unit 2521 acquires a character string from the head of the character strings defining the time-limit-information added file name to perform a folder name designation step (step S13), and then designates the acquired character string as a folder name (step S14).

Then, the transfer processing unit 2522 transfers the image data assigned with the time-limit-information added file name to the terminal apparatus 10 together with the designation of the folder name (step S15) to perform the transfer step.

Then, a folder having the designated folder name is created in the storage unit 140 of the terminal apparatus 10, and the image data assigned with the time-limit-information added file name is stored in the folder created in the storage unit 140. In this case, if the folder having the designated folder name does not exist in the storage unit 140, the folder name is newly created as described above, and if the folder having the designated folder name already exists in the storage unit 140, the image data is stored in the already existing folder. It should be noted that the character string acquired in the folder designation step may be the first character string CS1 alone or a combination of the first character string CS1 and the second character string C S2.

As above described, by designating the folder name using a particular character string as a storage folder name at a transfer destination for storing the image data, the process of opening the folder to check the data in the folder can be reduced. Further, the folder name may be also referred to as a directory name depending on a type of OS used by a user.

Figure 12A:
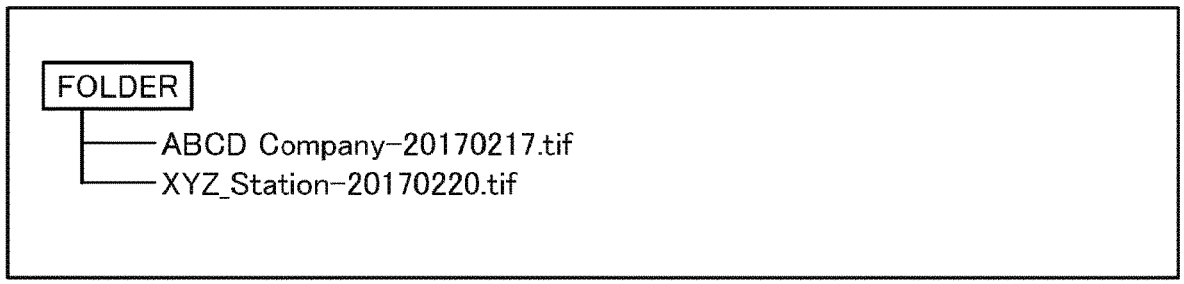
FIGS. 12A and 12B (FIG. 12) illustrate examples of a hierarchical structure in a folder, which is used as a transfer destination of image data.
Figure 12B:
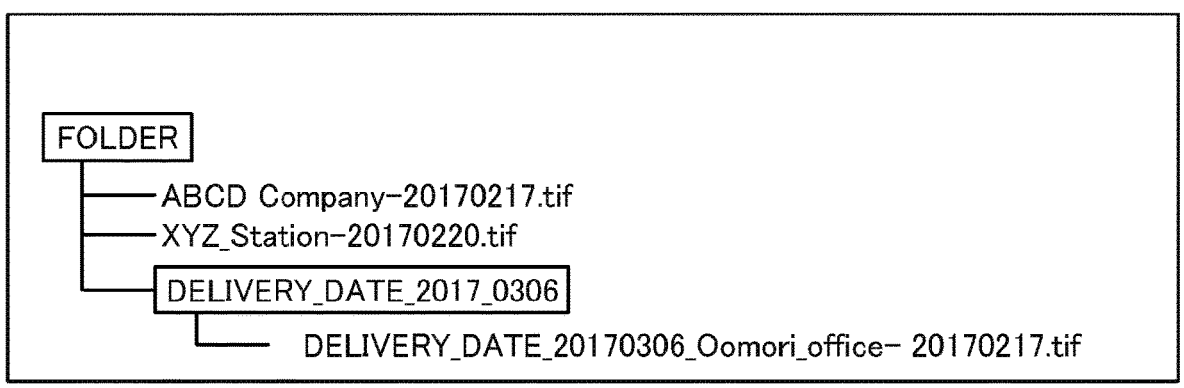

FIGS. 12A and 12B (FIG. 12) illustrate examples of a hierarchical structure in a folder of the terminal apparatus 10, which is a transfer destination for storing the image data. FIG. 12A is an example of a folder at a time when the time limit management is not yet performed. For example, image data is automatically stored in "FOLDER" which is used as a folder for automatically transferring facsimile data. The file name is arbitrarily assigned, such as "ABCD Company-20170217.tif," "XYZ_Station-20170220.tif" or the like.

In contrast, FIG. 12B is an example of a folder that has been transferred with the image data by performing the transfer process described with reference to FIG. 11. In this example case, the first character string CS1 and the second character string CS2 acquired from the beginning of "DELIVERY_DATE_20170306 Oomori_office-20170217.tif" are used as the folder name (directory name). Similar to the file name, it is not necessary to use both of the first character string CS1 and the second character string CS2 for the folder name. At least any one of the first character string CS1 and the second character string CS2 can be used for the folder name.

Hereinafter, a description is given of details of the OCR acquisition step performed in step S3 in FIG. 6 with reference to the sequence diagram of FIG. 13. The communication between the image forming apparatus 20 and the server 50 can be performed via the communication network 2 using the communication unit 220 of the mage forming apparatus 20 and the communication unit 520 of the server 50.

Figure 13:
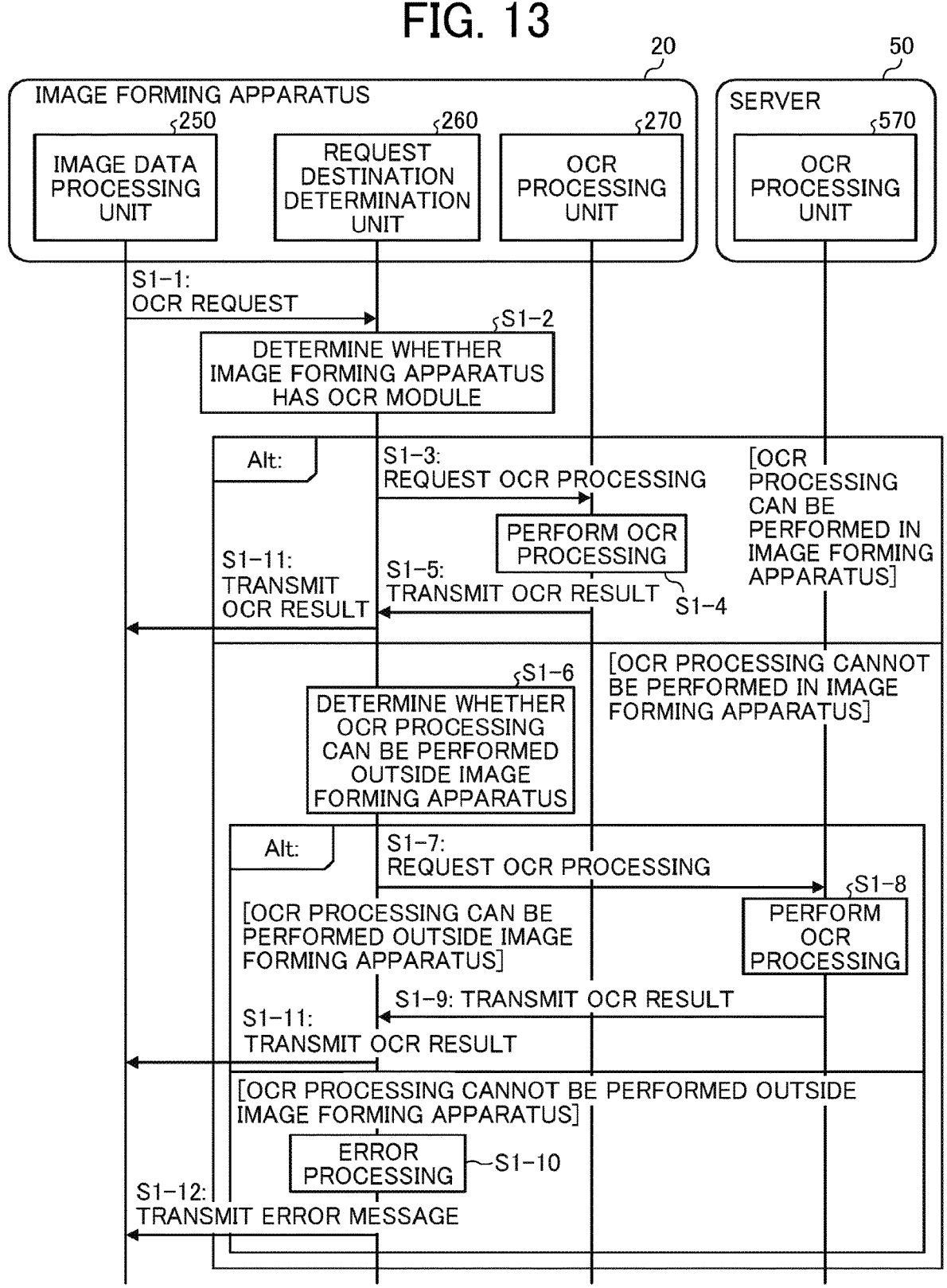
FIG. 13 is an example of a sequence diagram illustrating an OCR acquisition processing.

If image data is received via a facsimile commutation by performing the processing of the OCR acquisition unit 2511 or a command of performing the sequence of FIG. 13 to the image data is input from the input reception unit 210 by a user, the image data processing unit 250 transmits an OCR request to the request destination determination unit 260 (step S1-1).

The request destination determination unit 260 determines whether the OCR processing can be performed for the OCR request in the image forming apparatus 20, that is, the request destination determination unit 260 determines whether the image forming apparatus 20 has an OCR module which is an OCR processing unit (step S1-2). In the following description, the image forming apparatus 20 having the request destination determination unit 260 is referred to as "primary apparatus."

If the OCR processing can be performed in the primary apparatus, the request destination determination unit 260 transmits an OCR processing request to the OCR processing unit 270 (step S1-3), the OCR processing unit 270 performs the OCR processing (stop S1-4), the OCR processing unit 270 transmits the OCR result to the request destination determination unit 260 (step S1-5), and then the request destination determination unit 260 transmits the OCR result to the OCR acquisition unit 2511 in the image data processing unit 250 (step S1-11).

By contrast, if the OCR processing cannot be performed in the primary apparatus, that is, when the OCR processing unit 270, which is an OCR module, is not mounted in the image forming apparatus 20, or if the OCR processing unit 270 mounted in the image forming apparatus 20 cannot be used, the request destination determination unit 260 determines whether the OCR processing can be performed outside the primary apparatus (step S1-6). The OCR processing unit 270 mounted in the image forming apparatus 20 cannot be used, for example, when the OCR module is performing the OCR processing for another data, and/or the processing load in the primary apparatus is heavy.

Information of a server equipped with an available OCR module can be stored in the storage unit 240 prior to the shipment of the image forming apparatus 20 or can be stored in the storage unit 240 by a user. The request destination determination unit 260 may have a function of displaying a screen necessary for registering the server available for use on the operation unit 33 when the user is to store the information of the server equipped with the available OCR module in the storage unit 240.

In this example case, if the OCR processing unit 270 is not mounted in the image forming apparatus 20, the OCR processing unit 270 alone is deleted from the configuration of the image forming apparatus 20 in FIG. 5. In this case, the image forming apparatus 20 of FIG. 5 corresponds to the image forming apparatus 20A of FIG. 1, and the configuration deleting the OCR processing unit 270 from the image forming apparatus 20 of FIG. 5 can be corresponded to the image forming apparatus 20B of FIG. 1.

If the server 50 that can perform the OCR processing exists outside the primary apparatus, the request destination determination unit 260 transmits the OCR processing request to the OCR processing unit 570 of the server 50 (step S1-7), the OCR processing unit 570 of the server 50 performs the OCR processing (step S1-8), the OCR processing unit 570 of the server 50 transmits the OCR result to the request destination determination unit 260 in the primary apparatus (step S1-9), and then the request destination determination unit 260 transmits the OCR result to the OCR acquisition unit 2511 in the image data processing unit 250 (step S1-11).

If the OCR processing unit that can perform the OCR processing does not also exist outside the primary apparatus, the request destination determination unit 260 performs the error processing (step S1-10). As to the error processing, for example, an error message is generated for the OCR acquisition unit 2511, and then the request destination determination unit 260 transmits the error message to the OCR acquisition unit 2511 (step S1-12).

As above described, the application issues the OCR request alone and does not have to be aware of where the OCR processing is actually performed. Further, the OCR processing unit 270 and the OCR processing unit 570 can be configured to transmit the OCR result to the OCR acquisition unit 2511 directly, not via the request destination determination unit 260 as in the case of steps S1-5 and S1-9.

Conventionally, an image scanning apparatus scans a document image, recognizes characters in the scanned document image, and then extracts one or more character strings having a higher frequency of appearance from character strings, such as phrases, extracted by performing a character recognition processing. Then, the image reading apparatus determines whether pre-set forbidden characters are included in the character strings having the higher frequency of appearance. If no forbidden characters are included in the extracted character strings, the extracted character strings are presented to a user, and the character string selected by the user is determined to be the file name.

However, since the character strings having the higher frequency of appearance in the image data are extracted, it is difficult to register a character string having a lower frequency of appearance in the image data as a file name although the character string having the lower frequency of appearance may be important for managing files.

As to the above described embodiment, image data can be managed by using a specific character string as a file name without considering the frequency of appearance of the specific character string in the image data.

The above described one or more programs for the image forming apparatus 20 can be recorded on a computer-readable recording medium by a file of an installable format or an executable format, and the computer readable recording medium can be distributed. Further, the recording medium includes other recording medium, such as compact disc recordable (CD-R), a digital versatile disk (DVD), a Blu-ray disc, or the like. Further, the recording medium or the hard disk (HD) in which these programs are stored can be provided as a program product in one country or abroad.

Further, the image forming apparatus 20 described in each of the above embodiments can be configured as single apparatus or can be configured by dividing each part (functional unit or means) and disposing each part at a plurality of apparatuses.

Each of the functions of the above-described embodiments can be implemented by one or more processing circuits or circuitry. The "processing circuit" includes various devices, such as a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

Numerous additional modifications and variations are possible in light of the above teachings. It is therefore to be understood that, within the scope of the appended claims, the disclosure of this patent specification can be practiced otherwise than as specifically described herein. Any one of the above-described operations may be performed in various other ways, for example, in an order different from the one described above.

What is claimed is:

1. An information processing system, comprising:
    circuitry configured to
        acquire an optical character recognition OCR result of image data, obtained by performing OCR processing on the image data;
        store the OCR result in a memory;
        extract a first character string from the OCR result stored in the memory; and
        generate a file name to be assigned to a file of the image data using the extracted first character string,
    wherein the circuitry is further configured to extract a second character string from the OCR result stored in the memory, and generate the file name to be assigned to the file of the image data using the extracted first character string and the extracted second character string; and
    the first character string represents a time limit indicator while the second character string represents exact time limit information.

2. The information processing system according to claim 1,
    wherein, when the image data includes data of a plurality of pages and the circuitry extracts the first character string from data of a particular page before completing processing of the data of all of the pages, the circuitry is further configured to stop acquiring the OCR result from data of one or more pages remaining after the particular page.

3. The information processing system according to claim 1,
    wherein the circuitry is further configured to designate a folder name of the file of the image data using one or more character strings extracted from the file name assigned to the file of the image data.

4. The information processing system according to claim 3, further comprising:
a terminal apparatus including a terminal memory; and
an information processing apparatus configured to transfer the image data to the terminal apparatus,
wherein the information processing apparatus designates the folder name to be set in the terminal apparatus when the image data is transferred to the terminal apparatus and stored in the terminal memory.

5. The information processing system according to claim 1, further comprising:
a terminal apparatus including a terminal memory; and
an information processing apparatus configured to receive facsimile data and to transfer the facsimile data as the image data to the terminal apparatus.

6. A method of processing information, comprising:
acquiring an optical character recognition (OCR) result of image data, obtained by performing OCR processing on the image data;
storing the OCR result in a memory;
extracting a first character string from the OCR result stored in the memory; and
generating a file name to be assigned to a file of the image data using the extracted first character string,
wherein the method further includes extracting a second character string from the OCR result stored in the memory, and generating the tile name to be assigned to the tile of the image data using the extracted first character string and the extracted second character string; and
the first character string represents a time limit indicator while the second character string represents exact time limit intormation.

7. A non-transitory computer readable storage medium storing one or more instructions that, when performed by one or more processors, cause the one or more processors to execute a method of processing information comprising:
acquiring an optical character recognition (OCR) result of image data, obtained by performing OCR processing on the image data;
storing the OCR result in a memory;
extracting a first character string from the OCR result stored in the memory; and
generating a file name to be assigned to a file of the image data using the extracted first character string,
wherein the method further includes a second character string from the OCR result stored in the memory. and generating the file name to he assigned to the file of the image data using the extracted first character string and the extracted second character string; and
the first character string represents a time limit indicator while the second character string represents exact time limit information.

* * * * *